UNITED STATES PATENT OFFICE 2,308,675

DIAZOAMIDO COMPOUNDS

Heinrich Clingestein and Hans Schrum, Cologne, Germany, assignors to Winthrop Chemical Company, Inc., New York, N. Y., a corporation of New York No Drawing. Application October 31, 1940, Serial No. 363,710. In Germany October 10, 1939

8 Claims. (Cl. 260—140)

This invention relates to new diazoamido compounds which are soluble in water and useful for therapeutic purposes.

In accordance with the present invention, therapeutically valuable products are obtainable by the manufacture of diazoamido compounds from diazotized p-amino substituted sulfonamides, alkyl- and aryl-sulfones of the aromatic, heterocyclic and aromatic-heterocyclic series and primary or secondary organic amino compounds containing as water-solubilizing groups carboxylic, sulfonic and/or sulfinic acid groups or a number of aliphatically bound hydroxyl groups. The said acid groups are preferably present in salt form. The said compounds, eventually in the form of their salts with metal or amine bases, are readily soluble in water with neutral reaction. They are distinguished by their therapeutic activity in the tuberculosis infection of warm-blooded individuals.

As the diazotized p-amino substituted sulfonamides of the aromatic, heterocyclic and aromatic-heterocyclic series, for instance, the diazo compounds of 4-aminobenzenesulfonamide, 4-aminobenzenesulfonedimethyl- or diethylamide, 4-(4'-aminobenzenesulfonamido) - benzene-sulfonamide, -sulfonedimethylamide and -sulfonediethylamide, 4 - (4'-aminobenzylamino) - benzenesulfonamide as well as their substitution products may be used; such substitution products are, for instance, those which contain in the sulfonamide group alkyl groups as indicated above, furthermore aryl-, such as phenyl, aminoaryl, such as aminophenyl, aralkyl, such as benzyl, cycloalkyl, such as cyclopentyl, cyclohexyl and cyclohexenyl, acyl, such as acetyl, propionyl and benzoyl, and heterocyclic radicals such as the pyridyl and thiazolyl radicals. The examples mentioned before show that the 4-aminobenzenesulfonamide radicals may be contained several times in the said aminosulfonamide compounds. Suitable diazotized p-aminoalkyl- and -arylsulfones of the aromatic, heterocyclic or aromatic-heterocyclic series are, for instance, the compounds of 4-aminophenyl-alkyl-sulfones, such as 4-amino-phenyl-ethylsulfone, 4-aminophenyl-propylsulfone and 4-aminophenyl-butylsulfone, 4-aminodiphenylsulfone and 4,4'-diaminodiphenylsulfone. In the afore-mentioned aminosulfonamide compounds and aminosulfone compounds halogen atoms, alkyl or alkoxy groups may be present as substituents of the nuclear radicals.

Suitable aminocarboxylic, -sulfonic and -sulfinic acids are, for instance, aminoalkyl- or aminoaryl-carboxylic acids such as sarcosin, the aminobenzoic acids, heterocyclic aminocarboxylic acids such as prolin and piperidine-carboxylic acids, aminoarylsulfinic acids such as aminobenzenesulfinic acids, aminoalkylsulfonic acids such as methyltaurin and aminoarylsulfonic acids; particularly, the aminosulfocarboxylic acids, aminopolysulfonic acids and aminopolycarboxylic acids which have been described in U. S. Patent 1,858,623, 1,871,850 and 1,874,524, for instance, 2-amino-4-sulfobenzoic acid, 2-amino-5-sulfobenzoic acid, aminobenzene-2,5-disulfonic acid and their N-monoalkyl derivatives may be used. Suitable amino compounds of polyvalent aliphatic alcohols are, for instance, the amino compounds derived from sugars such as methylglucosamine and the like.

Accordingly, the new diazoamido compounds correspond approximately to the following general formula:

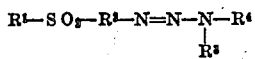

In this formula, $R^1$ stands, for instance, for an amino-, dimethylamino, diethylamino, acetylamino, benzoylamino, p-sulfamidephenylamino, p-sulfodimethylamide-phenylamino, α - pyridylamino, thiazolyl-2-amino, 5-methylthiazolyl-2-amino, 5-phenyl-thiazolyl-2-amino, furthermore for alkyl, for instance, ethyl, propyl and butyl, or phenyl-groups or for the radical

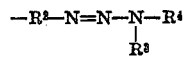

of the above formula, $R^2$ stands for an aromatic, heterocyclic or aromatic-heterocyclic radical, $R^3$ stands for hydrogen, methyl, ethyl, hydroxyethyl, propyl and the like, and $R^4$ stands for the radical of a carboxylic or sulfonic acid or of an aliphatic polyhydroxy compound, for instance, for the radical of phenylcarboxylic and/or sulfonic acids, alkylcarboxylic and sulfonic acids, glucose or mannose; suitable radicals of a more complex nature are, for instance, the radical

—C(NH)—NH.CO.NH.SO₃H, the radical of carboxyphenylsulfone-methylamido-ethanesulfonic acid; the radical

may also stand, for instance, for the radical of piperidine-carboxylic acid. It results that many variations of the fundamental idea of the present invention may be made without departing from the spirit of the present invention.

In accordance with the present invention, the said new diazoamido compounds are prepared by reacting diazo compounds of the kind specified before with a primary or secondary amine as identified above. The reaction is carried out in the manner known per se. The new products may also be obtained by converting in a diazoamido compound of the kind specified, but containing instead of the free carboxylic-, sulfonic-, sulfinic or hydroxyl groups another reactive substituent which is capable of being converted into one of the said groups, the said reactive substituent into the afore-mentioned groups. Such reactive substituents are, for instance, carboxylic acidester, carboxylic acidamide, carboxylic acidnitrile, sulfonic acidester, and acylated hydroxyl groups which can be converted into the corresponding free groups by saponification.

The invention is furthermore illustrated by the following examples, without, however, being restricted thereto:

Example 1

0.11 mol of 4-aminobenzoic acid is dissolved to a neutral solution. After the addition of 14 grams of anhydrous sodium acetate, the solution is mixed with a solution of 0.1 mol diazotized 4-aminobenzenesulfonamide at about 10° C., whereupon the diazoamido compound, being difficultly soluble in a weakly acid or neutral medium, separates. The mixture is then made alkaline by dropping in dilute sodium hydroxide solution, whereupon the diazoamido compound dissolves. It is reprecipitated from the filtered solution in the form of the monosodium salt by carefully neutralizing the solution with acetic acid. The sodium salt of the 4-(4'-sulfonamidobenzene-1')-diazoaminobenzoic acid thus obtained is sucked off, again recrystallized and finally dried in vacuo at low temperature.

Example 2

0.11 mol of sodium-2-amino-4-sulfobenzoate is dissolved in water. After the addition of 14 grams of sodium acetate, the solution is mixed at about 10° C. with a solution of 0.1 mol of diazotized 4-aminobenzene sulfonamide. The mixture is then made neutral or slightly alkaline by dropping in dilute sodium hydroxide solution, whereupon the sodium salt of the diazoamido compound formed in part separates. As soon as no diazo compound is still more present, 10% of sodium chloride (calculated on the weight of the reaction liquid) are added. For purification, the precipitate sucked off is dissolved in 600 ccm. of moderately warm water. It is reprecipitated from the filtered solution by adding solid sodium chloride or saturated sodium chloride solution. The 2-(4'-sulfamidobenzene-(1')-diazoamino)-4-sulfobenzoic acid is obtained as the disodium salt in the form of yellow crystals being considerably stable in alkaline solution, whereas they decompose easily when treated with mineral acids in the cold and with organic acids in the heat.

In the same manner, the 2-(4'-sulfonamido-benzene-(1')-diazoamino)-5-sulfo-benzoic acid is obtained when the 2-amino-5-sulfobenzoic acid is used as starting material.

Example 3

A neutral solution of 0.12 mol of β-methyl-amino-ethanesulfonic acid is mixed with 14 grams of sodium acetate and cooled to about 0° C. Then a solution of 0.1 mol of diazotized 4-aminobenzenesulfonamide is added and dilute sodium hydroxide solution is dropped in while cooling until the reaction is weakly alkaline; thereupon a yellow difficultly soluble by-product precipitates which is separated by filtration. The diazoamido compound formed is precipitated from the filtrate by the addition of 25% of sodium chloride. It may be purified by repeated reprecipitation with sodium chloride.

Example 4

A neutral solution of 0.11 mol of β-methyl-amino-ethanesulfonic acid is mixed with 14 grams of sodium acetate and at about 0° C. with a solution of 0.1 mol of diazotized 4-aminobenzenesulfonedimethylamide. If dilute sodium hydroxide solution is dropped in till the reaction is weakly alkaline, the diazoamido compound formed separates. It is sucked off and may be dissolved in warm water for purification and precipitated again by the addition of sodium chloride. Instead of β-methylamino-ethanesulfonic acid, methylaminoacetic acid, sulfanilic acid or methylglucosamine may be employed as coupling components.

Example 5

(a) A neutral solution of 0.11 mol of p-aminobenzoic acid is treated with 14 grams of sodium acetate and at about 0° C. with a solution of 0.1 mol of diazotized 4-aminobenzenesulfonedimethylamide. The precipitating diazoamido compound is sucked off after some time, dissolved in warm water while adding excess sodium carbonate and reprecipitated from the filtered and to about 1500 ccm. dilute solution with a mixture of sodium chlorite and ammonium chloride.

(b) 0.11 mol of p-aminobenzoic acid ethylester is dissolved with 14 ccm. of hydrochloric acid (d 1.15) and treated, after having been cooled to about 5° C., with a solution of 0.1 mol of diazotized 4 - aminobenzenesulfonedimethylamide. A solution of 45 grams of sodium acetate is slowly added to the suspension which soon has been formed; after several hours' stirring the coupling to the diazoamido compound has been finished; this compound is sucked off. For saponification, the solution of the product obtained is shortly boiled in 750 ccm. of alcohol after the addition of a solution of 50 grams of sodium hydroxide in 500 ccm. of alcohol; then the alcoholic solution is diluted with much ice water, the saponified diazoamido compound is precipitated with excess acetic acid, sucked off, dissolved with sodium carbonate solution as indicated under (a), and reprecipitated with a mixture of sodium chloride and ammonium chloride.

Example 6

A neutral aqueous solution of 0.11 mol of 4-sulfo-2-aminobenzoic acid is treated with 14 grams of sodium acetate and at about 0° C. with a solution of 0.1 mol of diazotized 4-aminobenzenesulfonedimethylamide. Sodium hydroxide solution is added to the suspension which has been formed until the reaction is weakly alkaline. When warmed to about 50° C., the precipitate dissolves for the greatest part. The diazoamido compound is precipitated by the addition of 20% sodium chloride. For purification, it may be dissolved in water and reprecipitated from the filtered solution with sodium chloride. Instead of 4-sulfo-2-aminobenzoic acid, 5-sulfo-2-aminobenzoic acid may also be employed as the coupling component.

Example 7

A neutral aqueous solution of 0.11 mol of 2-ethylamino-5-sulfobenzoic acid is treated with 14 grams of sodium acetate and at about 0° C. with a solution of 0.1 mol of diazotized 4-aminobenzenesulfonedimethylamide. The solution thus formed is neutralized with sodium hydroxide solution. The formed diazoamido compound separates slowly from the neutral solution after the addition of 25% of sodium chloride.

Example 8

A neutral aqueous solution of 0.11 mol of β-[N-methyl-N-(4-methylamino-3-carboxybenzene-1-sulfonyl)]-aminoethanesulfonic acid is treated with 14 grams of sodium acetate and at about 0° C. with a solution of 0.1 mol of diazotized 4-aminobenzenesulfonedimethylamide. A suspension soon is formed. The suspension is made weakly alkaline by the addition of sodium hydroxide solution. From the solution thereupon formed the diazoamido compound separates after the addition of 25% of sodium chloride.

Example 9

21.4 grams of 4-aminobenzenesulfone-acetamide are dissolved in 100 ccm. of water and 30 ccm. of 36% hydrochloric acid. 70 ccm. of a 10% sodium nitrite solution are dropped in at a temperature of 5° C. while stirring and cooling with ice. After the diazotization the solution of the diazonium salt is poured into a solution of 4.4 grams of caustic soda, 15 grams of 4-aminobenzoic acid, 20 grams of sodium acetate and 100 ccm. of water while stirring. The diazoamido compound having an orange color is sucked off, dissolved in sodium carbonate solution and precipitated with acetic acid.

Example 10

24.8 grams of 4,4'-diaminodiphenylsulfone are dissolved in 300 ccm. of water and 60 ccm. of 36% hydrochloric acid. 140 ccm. of a 10% sodium nitrite solution are dropped in at a temperature of 5° C. while stirring and cooling with ice. After the diazotization, the solution of the diazonium salt is poured into a solution of 16.0 grams of caustic soda, 48.4 grams of 2-amino-4-sulfo-benzoic acid, 30 grams of sodium acetate and 400 ccm. of water while stirring. After the addition of sodium hydroxide solution up to the alkaline reaction of the mixture, the diazoamido compound is precipitated with much sodium chloride and purified by reprecipitation with sodium chloride.

Example 11

39.8 grams of 4-aminophenyl-n-propylsulfone are dissolved in 300 ccm. of water and 60 ccm. of 36% hydrochloric acid. 140 ccm. of a 10% sodium nitrite solution are dropped thereto while stirring and cooling with ice. After the diazotization the solution of the diazonium salt is poured into a solution of 16.0 grams of caustic soda, 48.3 grams of 2-amino-4-sulfo-benzoic acid, 50 grams of sodium acetate and 300 ccm. of water while stirring. After 2 hours' stirring, the solution is made alkaline and the diazoamido compound is precipitated with sodium chloride.

Example 12

40 grams of 4-amino-3-chloro-phenyl-n-propylsulfone are dissolved in water, glacial acetic acid and 55 ccm. of 36% hydrochloric acid. A solution of 12 grams of sodium nitrite in 50 ccm. of water is dropped thereto while stirring and cooling with ice. After the diazotization the solution of the diazonium salt is poured into a solution of 13.7 grams of caustic soda, 41.5 grams of 2-amino-4-sulfobenzoic acid, 50 grams of sodium acetate and 400 ccm. of water while stirring. After 4 hours' stirring, the solution is made alkaline and the diazoamido compound is precipitated with sodium chloride.

Example 13

40 grams of 3-chloro-4-amino-diphenylsulfone are dissolved in 45 ccm. of 36% hydrochloric acid and 75 ccm. of glacial acetic acid. A solution of 13.5 grams of sodium nitrite in 50 ccm. of water is dropped thereto at a temperature of 5° C. while stirring. After 3 hours' stirring at 5° C. the solution of the diazonium salt is poured into a solution of 12.0 grams of caustic soda, 36 grams of 2-amino-4-sulfobenzoic acid, 50 grams of sodium acetate and 400 ccm. of water while stirring. After 3 hours' stirring at normal temperature, the solution is made alkaline and the diazoamido compound is precipitated with sodium chloride.

Example 14

65.4 grams of 4-(4'-aminobenzenesulfonamido-benzenesulfonamide are suspended in 300 ccm. of water and 60 ccm. of 36% hydrochloric acid. 140 ccm. of a 10% sodium nitrite solution are dropped thereto at 5° C. while stirring and cooling with ice. After 3 hours' stirring at a temperature of 5° C., the diazotization has been finished. The solution of the diazonium salt containing some precipitated diazonium salt is added to a solution of 8.3 grams of caustic soda, 30 grams of 4-aminobenzoic acid, 50 grams of sodium acetate and 300 ccm. of water while stirring, whereupon the reddish-yellow diazoamido compound precipitates. This compound may be purified by dissolving in dilute sodium hydroxide solution and precipitating with glacial acetic acid.

In the same manner, 71.0 grams of 4-(4'-aminobenzenesulfonamido)-benzenesulfonedimethylamide are diazotized and converted with 4-aminobenzoic acid into the corresponding yellow diazoamido compound.

Example 15

65.4 grams of 4-(4'-aminobenzenesulfonamido)-benzenesulfonamide are suspended in 300 ccm. of water and 60 ccm. of 36% hydrochloric acid. 140 ccm. of a 10% sodium nitrite solution are dropped thereto at a temperature of 5° C. while stirring and cooling with ice. After 3 hours' stirring at a temperature of 5° C. the diazotization has been finished. The solution of the diazonium salt containing some precipitated diazonium salt is poured into a solution of 16.0 grams of caustic soda, 48.4 grams of 2-amino-4-sulfobenzoic acid, 50 grams of sodium acetate and 400 ccm. of water while stirring. After adding carefully dilute sodium hydroxide solution up to a weakly alkaline reaction, the corresponding yellowish-red diazoamido compound is precipitated with 450 grams of sodium chloride. The compound may be purified by dissolving in water and reprecipitating with sodium chloride.

In an analogous manner, 71.0 grams of 4-(4'-aminobenzenesulfonamido) - benzenesulfonedimethylamide are diazotized and converted with 2-amino-4-sulfobenzoic acid into the corresponding diazoamido compound.

Example 16

A neutral solution of 0.12 mol of hydroxethylamino-acetic acid is treated with 14 grams of sodium acetate and at about 0° C. with a solution of 0.1 mol of diazotized 4-aminobenzenesulfonamide. If dilute sodium hydroxide solution is dropped in up to a weakly alkaline reaction while cooling, the diazoamido compound separates. It is wholly precipitated by the addition of 25% of sodium chloride, sucked off and digested for purification with 300 ccm. of warm water. It dissolves with the exception of a small smeary residue which is separated by filtration. The filtrate is stirred for a short time with animal charcoal, filtered once more and the diazoamido compound is precipitated from the now clear solution by adding 25% of sodium chloride.

Example 17

45 grams of guanylurea-N-sulfonic acid are added to 700 ccm. of water heated to 80° C. while stirring. 23 grams of calciumoxide and 28 grams of calciumacetate are added thereto. The suspension is stirred for some time, cooled to 5° C. and a solution of 0.1 mol of diazotized 4-aminobenzenesulfonedimethylamide is quickly poured therein. After stirring for several hours, 400 ccm. of a 20% sodium carbonate solution are added. The solution is then heated to 50° C., filtered, the filtrate is cooled to 10° C. and the diazoamido compound is precipitated by the addition of 25% of sodium chloride. It may be purified by dissolving once more in warm water and precipitating with sodium chloride.

Example 18

A neutral solution of 0.12 mol of piperidine-α-carboxylic acid is treated with 14 grams of sodium acetate and at about 0° C. with a solution of 0.1 mol of diazotized 4-aminobenzenesulfonedimethylamide. After dropping in sodium hydroxide solution, an in part mucous precipitate soon separates which dissolves again when sodium hydroxide solution is added to a distinctly alkaline reaction. The free alkali is then removed by bicarbonate, the solution is stirred with animal charcoal, filtered and treated with 25% of sodium chloride. After stirring for a long time, the diazoamido compound precipitates as an oil which solidifies. For purification, it is dissolved in water, the solution is treated again with animal charcoal and the diazoamido compound reprecipitated by means of sodium chloride.

Example 19

A solution of 0.12 mol of the sodium salt of the ethanolaminomethylsulfonic acid is treated with 14 grams of sodium acetate and at about 0° C. with a solution of 0.1 mol of diazotized 4-(4'-aminobenzenesulfonamido) - benzenesulfonedimethylamide. Then sodium hydroxide solution is dropped in up to a weakly alkaline reaction and the separating diazoamido compound is wholly precipitated by adding sodium chloride. It is sucked off for purification, dissolved in warm water and reprecipitated from the solution which has been cleared with animal charcoal by the addition of 25% of sodium chloride.

We claim:

1. A diazoamido compound from a diazotized amino compound selected from the group consisting of p-amino substituted sulfonamides and alkyl- and aryl-sulfones of the benzene series, and an organic amino compound containing water-solubilizing groups of the group consisting of primary and secondary amino-carboxylic, sulfonic and sulfinic acids and aliphatic amino polyhydroxy compounds.

2. A diazoamido compound from a diazotized p-amino benzenesulfonamide, and an organic amino compound containing water-solubilizing groups of the group consisting of primary and secondary amino-carboxylic, sulfonic and sulfinic acids and aliphatic amino polyhydroxy compounds.

3. A diazoamido compound from a diazotized amino compound selected from the group consisting of p-amino substituted sulfonamides and alkyl- and aryl-sulfones of the benzene series, and an aminobenzene compound containing at least one hydrogen atom in the amino group and at least one acid group.

4. A diazoamido compound from a diazotized p-amino benzenesulfonamide and an aminobenzene compound containing at least one hydrogen atom in the amino group and at least one acid group.

5. A diazoamido compound from a diazotized amino compound selected from the group consisting of p-amino substituted sulfonamides and alkyl- and aryl-sulfones of the benzene series, and an aminobenzenecarboxylic acid.

6. A diazoamido compound from a diazotized p-amino benzenesulfonamide, and an aminobenzenecarboxylic acid.

7. A diazoamido compound from a diazotized amino compound selected from the group consisting of p-amino substituted sulfonamides, alkyl- and aryl-sulfones of the benzene series, and an aminobenzenesulfocarboxylic acid.

8. A diazoamido compound from a diazotized p-amino benzenesulfonamide and an aminobenzenesulfocarboxylic acid.

HEINRICH CLINGESTEIN.
HANS SCHRUM.